United States Patent [19]
Ahrweiler

[11] Patent Number: 5,456,872
[45] Date of Patent: Oct. 10, 1995

[54] INHERENTLY RIGID LAMINATE MATERIAL CONTAINING PLASTIC TRIMMINGS AND A METHOD FOR PRODUCING SAME

[75] Inventor: Karl-Heinz Ahrweiler, Willich, Germany

[73] Assignee: Eduard Küsters Maschinenfabrik GmbH & Co. KG, Krefeld, Germany

[21] Appl. No.: 976,798

[22] Filed: Nov. 16, 1992

[30] Foreign Application Priority Data

Nov. 15, 1991 [DE] Germany .................. 41 37 744.3

[51] Int. Cl.[6] ............................................... D04H 3/16
[52] U.S. Cl. ................... 264/115; 264/109; 264/112; 264/DIG. 69; 428/284; 428/903.3
[58] Field of Search ................... 428/903.3, 284; 156/290; 264/109, 112, 115, DIG. 69

[56] References Cited

FOREIGN PATENT DOCUMENTS

| 2439671 | 3/1976 | France . |
| 2157746 | 10/1978 | France . |
| 0119840 | 5/1976 | Germany . |

*Primary Examiner*—James J. Bell
*Attorney, Agent, or Firm*—Kenyon & Kenyon

[57] ABSTRACT

A method for manufacturing a laminate material for use as a surface covering or the like, by reusing plastic trimmings, includes the step of forming a layer from the plastic trimmings, and preferably subjecting both sides to a surface compression while simultaneously providing heat transfer, thus allowing the zones near the surface to be melted on.

11 Claims, 1 Drawing Sheet

INHERENTLY RIGID LAMINATE MATERIAL CONTAINING PLASTIC TRIMMINGS AND A METHOD FOR PRODUCING SAME

BACKGROUND OF THE INVENTION

The present invention relates generally to a method for producing a more or less inherently rigid laminate material for use as a surface covering or the like, and more particularly to a method for producing a more or less inherently rigid laminate material that contains plastic trimmings or waste.

It is generally known that plastic trimmings or waste may be introduced (generally as admixtures) to laminate materials that contain plastics, such as flooring tiles, wall tiles, molded articles for motor vehicle trim, etc., in order to "stretch" the raw material that is used and to provide a sensible way to reuse plastic trimmings. As a rule, only carefully preselected plastic trimmings are suited for these purposes. Moreover, as a rule, more or less costly preparation steps are needed to make the plastic trimmings reusable for the process of manufacturing the laminate material and to ensure their suitability for the laminate material.

A substantial problem is presented, for example, when it is desired to reuse trimmings from textile fibers formed from plastic or containing plastics, and most especially when it is desired to reuse carpets—whether they be waste pieces from new textile fibers, in particular new carpets, or previously used textiles which are no longer needed, in particular carpets.

The present invention is directed to an improved method for reusing trimmings formed from textile fibers, particularly from carpets.

SUMMARY OF THE INVENTION

The present invention provides a method for producing a more or less inherently rigid laminate material for use as a surface covering or the like, by reusing plastic trimmings. According to the method, a waste material having textile fibers that are plastically moldable under the effect of heat is first ground up. A layer having a predetermined thickness is formed from the ground-up waste material. The layer is subject to surface compression while heat transfer is simultaneously provided onto at least one surface portion of the layer to form a laminate material. The laminate material is melted at only those regions where the compressed surface portion is exposed to heat transfer and in a zone adjacent to the surface portion near the surface. Finally, the thus formed laminate material is cooled.

According to another aspect of the invention, an inherently rigid laminate material containing plastic trimmings is provided. The laminate material includes a fibrous material having as a constituent textile fibers that are plastically moldable under the effect of heat. The fibrous material includes a first filler layer having first fibrous sections and at least one base forming an outer surface of two fiber sections that have been melted together.

According to the present invention, the term a more or less "inherently rigid laminate material" is understood to refer to any surface material having a generally specified uniform (though not necessarily) layer thickness. The material may be in the form of more or less flat tiles or sections, or it may form an inner wall—also that of a receptacle—of a three-dimensional (i.e., not flat) molded component, having a laminate structure made up of different layers.

The textile fibers that may be used in connection with the present invention may be either individual fiber strands, as well as cohesively processed strands of fiber, particularly in the form of carpet pieces.

The quantity of the plastic component of the waste material that may be used in connection with the invention can vary within wide limits. However, it should not fall below a lower limit of 1% of the total volume, and preferably not below 10% of the volume. As a rule, a higher plastic composition—up to 100%—are advantageous. If the plastic component is relatively low, it is recommended to admix a binding agent, consisting of a plastically moldable material, particularly a thermoplastic plastic, to the waste material.

The plastic contained in the textile fibers that are used in the present invention, or rather the plastic that the textile fibers are comprised of, must be plastically moldable under the effect of heat. This characteristic is provided by so-called thermoplastic plastics that are particularly advantageous to use, such as polyamides, polyolefins, polyvinyl, and the polyacyl resins. However, as the term is used herein, textile fibers that are "plastically moldable under the effect of heat" are also understood to include those fibers having plastic or plastic components that melt under the effect of heat and which, in this melted state, can be formed and then hardened after being cooled. It is not necessary for the plastic to retain its original properties. Rather, its properties can be fundamentally changed as the result of the plastic deformation resulting from the effects of heat. The only important property of the plastic is that the inherent rigidity desired for the purposes of the invention be achieved after the re-hardening step. However, thermoplastic plastics are a preferred material because the laminate material produced with these plastics in connection with the invention can, in turn, be reused. Thus, it is possible for the plastic to be reused repeatedly.

As the term is used herein for the purposes of describing the present invention, "inherent rigidity" of the laminate material is understood to mean that the material has a certain flexural stiffness, and thus a certain form-retaining capability, as well as certain spring-elastic properties. Consequently, the material may used, for example, as flooring or as wall covering, as a more or less self-supporting trim for hollow spaces, and as an inner wall for hollow-spaces, or the like.

BRIEF DESCRIPTION OF THE DRAWINGS

The sole FIGURE illustrates a cross-section of the laminate material constructed according to the method of the present invention.

DETAILED DESCRIPTION

Figure 1:
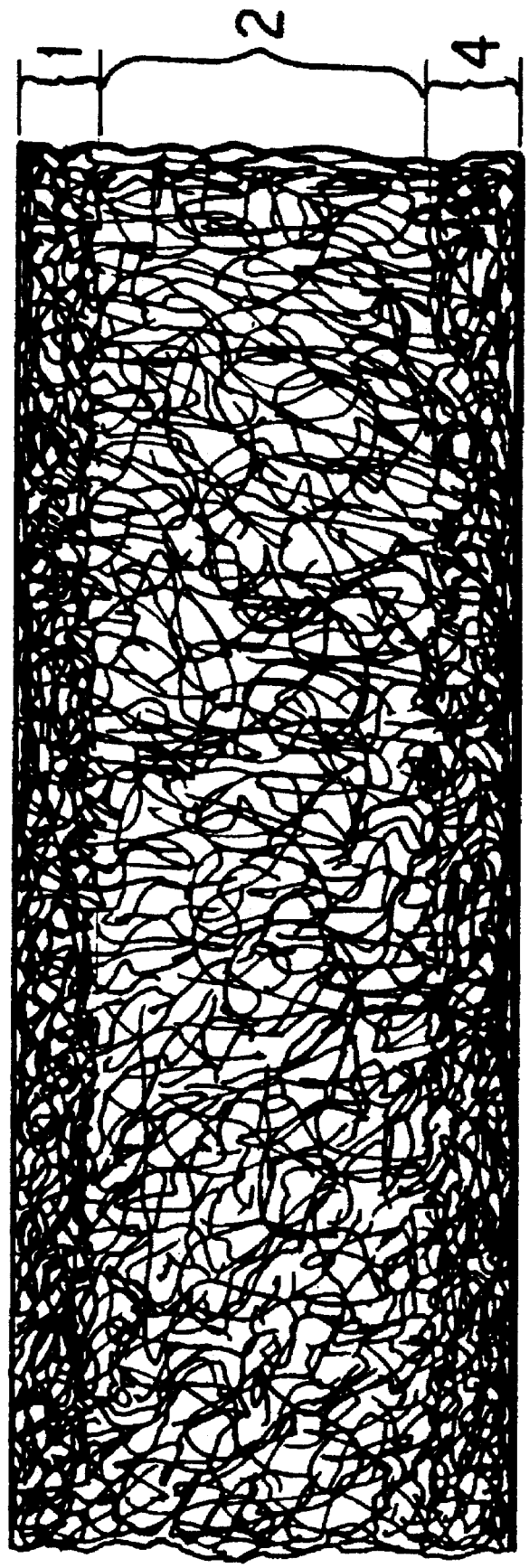

The laminate material according to the present invention can be produced using generally known methods and machines, particularly those that are known, for instance, in connection with the manufacturing of particle boards. The raw material (i.e., waste material) is initially piled up as a more or less loose layer and distributed over the surface of a base, if indicated, after first being ground by means of tearing or the like. This layer is then subjected to a surface compression while simultaneously undergoing heat transfer. This process can be undertaken in a continuous manner, advantageously on a continuous press. Such continuous presses are widely known and are disclosed, for example, in DE 21 57 746 C3. These types of manufacturing machines do not pertain to the subject matter of the invention, and in addition are widely known, along with their operating methods. Therefore, a detailed description of such machines and their methods of operation, as well as the manner in which a raw product may be introduced into such machines, is unnecessary.

The heat transfer, which occurs simultaneously during the surface compression operation, takes place under temperature and time conditions which are regulated so as to allow the laminate material to melt at the location or locations where its layer surface(s) are exposed to the heat transfer and in the zone adjacent to these layer surface(s), near the surface. It is understood, of course, that only those components of the material in question which are able to melt under the given temperature/time conditions, must melt. The zones of the laminate material which are further removed from the outer laminate surface are, in fact, also heated to a certain extent. However, this heating process does not cause the laminate material to be melted on, but at most leads to a softening or surface melting of the laminate material, so that a fibrous foundation structure is retained in these inner zones. Therefore, one portion of the textile fibers (i.e., the first fiber sections), is not subject to plastic being melted on, and thus forms the so-called filler layer, while the fiber sections which are situated in the outer laminate surface or in the zones near the surface, are melted together and form the so-called base or supporting layer for the laminate material. Accordingly, the laminate material has at least a two-layer structure. However, as a rule a three-layer structure is generally formed (one layer each near the surface which encloses the outer surface, and a filler layer, situated between the two layers, and which still has a fibrous structure).

It is understood, of course, that depending on the process parameters and the composition of the applied initial mixture, a relatively thin, relatively highly compacted surface layer is formed, which is adjacent to a more or less inhomogeneous filler layer. The transition between the two can be very pronounced, but it may also be gradual.

Extensive tests with used and unused carpet remnants or with mixtures of other textile fiber trimmings have shown that laminate materials produced or acquired according to the invention exhibit a surprisingly high transverse-tearing resistance. Accordingly, it is hardly possible for the layers to separate from one another and, in practical terms, it really is not possible at all.

A cross-section of a laminate material according to the invention is depicted in the FIGURE. As seen in the FIGURE, two zones 1 and 4 (i.e. bases) can be seen close to the mutually opposing, parallel laminate surfaces. A layer 2 forming the filler layer is disposed between the two zones and remote from the surfaces. It is evident from the FIGURE that the edge layers are heavily compacted, and consequently textile fibers can no longer be individually seen in this region because of melting. In contrast, in the filler layer 2 individual fibers can still be discerned. These fibers have been substantially bonded, but are also bonded to one another. Of course, in practice, only extremely small cavities are present in the laminate material. However, this feature is practically impossible to show in a drawing.

What is claimed is:

1. A method for producing a more or less inherently rigid laminate material for use as a surface covering or the like, by reusing plastic trimmings, said method comprising the steps of:

grinding up a waste material having textile fibers that are plastically moldable under the effect of heat;

forming a layer of a predetermined thickness from the ground-up waste material;

subjecting said layer to surface compression while simultaneously providing heat transfer onto at least one surface portion of said layer so that by melting the material at only those regions where the compressed surface portion is exposed to heat transfer and in a zone adjacent to said surface portion near the surface, a laminate material is formed; and cooling the thus formed laminate material.

2. The method of claim 1 wherein said waste material comprises a thermoplastic material.

3. The method of claim 1 wherein said waste material comprises carpet pieces.

4. The method of claim 1 wherein said step of grinding the waste material includes the step of tearing the waste material.

5. The method of claim 2 wherein said step of grinding the waste material includes the step of tearing the waste material.

6. The method of claim 3 wherein said step of grinding the waste material includes the step of tearing the waste material.

7. The method of claim 1 wherein the step of subjecting at least one surface portion of said layer to heat transfer comprises the step of subjecting both surface portions to heat transfer.

8. The method of claim 1 wherein the step of forming the layer comprises the step of forming the layer in a mold and further comprising the step of removing the laminate material from the mold after the step of cooling.

9. The method of claim 6 wherein the step of forming the layer comprises the step of forming the layer in a mold and further comprising the step of removing the laminate material from the mold after the step of cooling.

10. The method according to claim 1 wherein the step of subjecting said layer to surface compression comprises the step of providing compression and heat with a continuous press used for continuously producing particle boards or the like.

11. The method according to claim 9 wherein the step of subjecting said layer to surface compression comprises the step of providing compression and heat with a continuous press used for continuously producing particle boards or the like.

* * * * *